Patented Nov. 20, 1945

2,389,550

UNITED STATES PATENT OFFICE 2,389,550

CATALYTIC ALKYLATION PROCESS

William E. Ross, Berkeley, Sumner H. McAllister, Lafayette, and John Anderson, Berkeley, Calif., assignors to Shell Development Company, San Francisco, Calif., a corporation of Delaware No Drawing. Application February 27, 1941, Serial No. 380,892

11 Claims. (Cl. 260—683.4)

This invention relates to the alkylation of organic compounds by reaction with suitable alkylating agents, including aralkylating agents and the like in the presence of catalysts of the Friedel-Crafts type. It deals particularly with the use of more advantageous catalyst mixtures in such reactions.

Alkylations of a wide variety of compounds, using a great many different alkylating agents have been carried out in the laboratory with aluminum chloride and related catalysts. These reactions have been severely restricted in their commercial applications, however, because of the difficulties encountered in the attempts to employ catalysts of this type in large scale alkylation operations. This is especially the case in alkylating aromatic and aliphatic hydrocarbons with olefins. Therefore, for the purpose of making the invention more clear, it will be described with more particular reference to its application to such alkylations. It will be understood, however, that the invention is not limited to these illustrative applications, but may be applied with equal advantage to the alkylation of other organic compounds having a hydrogen atom which can be substituted by alkyl or aralkyl groups, which may or may not substituted, using the same or other agents capable of introducing such groups.

Aluminum chloride is a rather volatile high-melting solid which is relatively insoluble in the aromatic and aliphatic hydrocarbon to be alkylated and it is most difficult to secure efficient contact of alkylating agent, hydrocarbon and aluminum chloride without the application of excessive quantities of the latter. Furthermore, aluminum chloride and related alkylation catalysts of the Friedel-Crafts type react readily with traces of moisture and/or impurities in the reactants particularly the olefin and/or traces of products of side reactions to form sticky sludge-like material. These sludge-like materials are substantially insoluble in alkylation reaction mixtures. They coat the particles of aluminum chloride and prevent proper contact of the catalyst with the alkylating agent and compound being alkylated. This difficulty is further aggravated by the fact that once the catalyst particles become coated with this sludge they tend to agglomerate into hard, sticky lumps. This seriously interferes with continuous methods of carrying out alkylations with these catalysts. Thus, for example, if it is attempted to continuously pass a slurry of aluminum chloride and isoparaffin and alkylating agent through a tubular reactor, it is found that the reactor invariably becomes quickly coated and choked with this sludge-like material. As a result, alkylations carried out with these catalysts require excessive amounts of aluminum chloride and the larger proportion of the catalyst is discarded as practically worthless sludge. Furthermore, the alkylation must be carried out batch-wise or intermittently. In the production of fine chemicals where the cost of the catalyst is usually a small fraction of the total cost and operations are carried out in small batches, this inefficient utilization of the catalyst may be of relatively little importance. But in the production of motor fuels by alkylating aromatic and/or tertiary carbon atom-containing aliphatic hydrocarbons with olefins or the like where large-scale operations with inexpensive starting materials are necessary for financial success, the cost of the catalyst must be kept at a minimum. In alkylations of this type, moreover, the prevention of sludge formation and its attendant complications are especially difficult due to presence in the starting material of impurities which promote sludge formation with aluminum chloride and like catalysts.

An important object of the present invention is to provide an alkylation process in which sludge formation is minimized. Another object of the invention is to reduce the consumption of catalyst involved in Friedel-Crafts type of alkylations. A further object is to provide a more economical liquid phase method of carrying out alkylations in the presence of aluminum chloride and the like. Additional objects and advantages of the process of the invention will be apparent from the following description.

It has been proposed to employ as alkylation catalysts, complex addition compounds of the Gustavson and Ansolvo-acid types in which aluminum chloride or bromide is bound by secondary valence bonds to one or more organic compounds. These addition compounds are normally liquid and are in certain respects superior to the use of aluminum chloride or bromide alone. Under alkylation conditions, however, the organic components of the complex tend to split off and be substituted by the compound being alkylated and/or to be alkylated by the alkylating agent used. As a result, the composition of the catalyst is difficult to maintain constant and its viscosity tends to change with use so that constant careful supervision is required in order to keep proper proportions in the reaction mixture. Furthermore, these side reactions not only reduce the yield of desired product, but also introduce unwanted impurities. To overcome these disadvantages it has been suggested that complex double salts of aluminum chloride and aluminum bromide such as are produced by reacting these aluminum halides with alkali metal, alkaline earth metal and like halides be used as alkylation catalysts. These double salts are all solid compounds of relatively high melting point and low volatility. They must be used in the solid state because at the temperatures at which they are liquid the equilibrium between the reactants and the alkylation product is unfavorable and the conversions impractically low. It is usual, therefore, to use these catalysts impregnated on porous carriers. In alkylation reactions, such solid catalysts are rapidly coated with reaction products or sludge and soon lose their ability to catalyze the desired alkylation even when frequently subjected to regeneration treatments which of course add to the expense of the process.

In accordance with the present invention, many of the disadvantages of former alkylation processes are avoided by substituting for the aluminum halide alkylating agents used therein, a liquid alkylation catalyst comprising a complex double compound of an anhydrous aluminum halide and a hydrogen halide and a metal salt which does not react with the aluminum halide. Catalysts of this type are described and claimed in our copending application, Serial No. 363,676, filed October 31, 1940, Patent No. 2,370,195, of which the present application is a continuation-in-part.

From an economic standpoint there are advantages in using liquid mixtures comprising the double compound of anhydrous aluminum chloride and hydrogen chloride. Aluminum chloride is preferred not only because of its availability at a reasonable price, but also because a wider variety of metal salts form therewith, mixtures which are liquid at favorable alkylation temperatures. By employing with the chosen aluminum halide, only metal salts, in which term it is intended to include double salts and mixtures of metal salts, which do not react therewith, the secondary valence forces of the aluminum halide are preserved for the formation of the desired complex, i. e., hydrogen aluminum halide. As a result, a very active alkylation catalyst is obtained.

The non-reactive metal salt which it will be most desirable to use in a given alkylation will depend upon the temperature which is best suited to the reaction. From the melting point-composition diagram of binary mixtures of the salt and the chosen aluminum halide, the temperature range in which the catalyst will be liquid can be ascertained. Such diagrams have been determined for mixtures of the more common metal salts with aluminum-chloride and aluminum bromide and, therefore, it is also known which metals react with the aluminum halides and which do not. Thus, such salts as the halides of sodium, potassium, lithium, ammonium, calcium, magnesium, barium, copper, silver, etc., are known to form stable double salts with the corresponding aluminum halides and these binary mixtures are thus unsuitable for use in the present process. In other cases, such as the sulfates, nitrates, phosphates and other applicable metal salts of the stronger acids and in the case of binary, ternary and quaternary mixtures of metal salts, it is a simple matter to determine their suitability. Since the metal salts employed do not react with the aluminum halide used their mixture therewith will form simple eutectics or mixed crystals which are easily identified. Antimony trichloride is a preferred metal salt to use with aluminum chloride. Antimony tribromide, on the other hand, cannot be employed per se with aluminum bromide because it forms a double salt of the formula $AlBr_3 \cdot SbBr_3$ therewith. As examples of metal salts which may be used in the alkylation process of the invention with one or more aluminum halides may be mentioned the halides of arsenic, zirconium, molybdenum, palladium, tin, antimony, hafnium, tantalum, tungsten, tellurium, lead, bismuth and uranium.

While, in general, the catalyst may be prepared from any metal salt or mixture of salts which does not react with the aluminum halide and which is liquid at a suitable alkylation temperature, the catalysts prepared with certain metal salts are more advantageous alkylation catalysts than those produced from other salts. Thus, for example, catalysts prepared from metal salts having normal boiling points below about 300° C. are preferred because not only do they generally permit lower alkylation temperatures to be used but also they form catalysts which are easily recovered and reactivated by a simple distillation treatment. Also, it is preferred to choose metal salts or mixtures which have a relatively low solubility in the organic components of the alkylation mixture since this reduces the cost of recovery of salt from the product. Metal salts which undergo reaction with the alkylating agent or compound to be alkylated, as for example, halides which act as halogenating agents under the conditions of alkylation used are preferably not employed. For this reason, the applicable halides generally contain the metal in a lower valent state.

It is desirable that the aluminum halide comprise at least 3 mol % of the catalyst mixture in order that a practical alkylation rate may be maintained. Preferably a molar excess of metal salt over aluminum halide is used in order to suppress undesirable side reactions and more preferably two or more mols of metal salt or mixture of metal salts are used per mol of free aluminum halide. In general, it is advantageous to employ mixtures corresponding to or approaching the eutectic mixture as lower alkylation temperatures may thus be used. However, where the eutectic composition does not contain sufficient free aluminum halide to provide the desired alkylation rate or contains excessive amounts which produce undesirable side reactions, the composition may be adjusted to obtain a catalyst of more favorable alkylating activity and a slightly higher melting point. Thus, for example, excellent alkylation catalysts have been prepared from mixtures comprising 76 to 97 mol % antimony trichloride and 24 to 3 mol % aluminum chloride. Those prepared from mixtures containing about 9 mol % of free aluminum chloride and melting at about 70° C. are espectially advantageous. Mixtures containing higher proportions of aluminum chloride to antimony trichloride may, however, be used, in which case the melting point of the catalyst is somewhat increased.

The chosen mixture of aluminum halide and non-reactive metal salt may be treated with a hydrogen halide prior to use or the aluminum halide-hydrogen halide complex may be formed in the catalyst during the alkylation reaction by supplying the hydrogen halide with the reactants. Instead of using hydrogen halide itself, a material which will form hydrogen halide under the prevailing conditions may be employed. Thus, for example, chlorine, bromine, or organic halides or a small amount of water may be used. When alkyl halides are used as alkylation agents, no other hydrogen halide source may be required. Generally, it is preferable to use the hydrogen halide corresponding to the aluminum halide employed. A concentration of hydorgen halide in the feed of about 0.01 to about 1% is usually sufficient to maintain the desired activity of the catalyst, but higher concentrations up to 10% or more may be used, although these usually require recovery of the excess.

An advantage of the present process is that a substantial amount of hydrogen halide may be taken up in the metal salt mixture by solution, thus tending to increase the effective partial pressure of hydrogen halide in contact with the aluminum halide with reduced danger of contamination of the product by any excess halide used. Such contamination is especially undesirable in the production of motor fuels by alkylation since small amounts of chlorides tend to reduce the response of the fuels to addition to lead tetraethyl.

Any apparatus suitable for contacting the reactants with the liquid catalyst may be used. A form of apparatus which is preferred when reactants in the liquid phase are to be employed is described in U. S. Patent 2,232,674. Alternatively, the compound to be alkylated and the alkylating agent either or both in either the liquid or gaseous phase, may be bubbled through a preferably mechanically agitated body of the liquid aluminum halide-metal salt mixture. Jets or other means of injecting the reactants may provide the desired agitation. Towers, provided with trays or perforated plates or packing material over which the catalyst mixture is allowed to flow, may also be used. In some cases it may be desirable to have counter-current flow between a mixture of the compound being alkylated in the liquid phase and the catalyst mixture on the one hand and the alkylating agent, for example an olefin, in the gaseous state and hydrogen halide on the other. Batch or intermittent methods of operation may be employed although the process has special advantage in continuous operation.

For the preparation of mono-alkyl derivatives, it is desirable to employ at least a small molecular excess of the compound being alkylated compared with the alkylating agent used. Where isoparaffins are being alkylated with olefins it is advantageous to use a substantial excess of the isoparaffin, preferably at least two mols of isoparaffin per mol of olefin. Most preferably a feed containing a stoichiometric excess of the compound to be alkylated, based on the alkylating agent used, is introduced into a circulating mass of reacted mixture containing the liquid catalyst salt mixture dispersed therewith whereby the reaction is effected in the presence of a higher ratio of compound to be alkylated to alkylating agent than is present in the feed. In this way the alkylation of isoparaffins with olefins, for example, may economically be carried out at isoparaffin to olefin ratios of the order of 50 to 100 to 1 or more.

The process is carried out at temperatures at which the catalyst mixtures used are in the liquid state and preferably not more than about 25° C. above the melting point of the chosen catalyst mixture. Thus, in general, temperatures below 200° C. are preferred and most preferably temperatures below about 130° C. are used. Especially suitable for the alkylation of hydrocarbons are temperatures between about 40° and 110° C. The temperature of alkylation may be advantageously regulated by adjusting the temperature of the recycled molten catalyst. Vaporization of a part of the reaction mixture and/or direct heating or cooling may also be used to regulate the alkylation temperature.

Within the temperature limits imposed by the nature of the catalyst mixtures used, the alkylation process of the invention may be carried out under the same reaction conditions found suitable with the usual aluminum halide catalysts. Thus, for example, more drastic conditions are generally desirable when normal paraffins are to be reacted than when alkylating aromatic hydrocarbons or tertiary carbon atom-containing aliphatic hydrocarbons. As a rule a high proportion of catalyst phase to liquid hydrocarbons is desirable for promoting high yields of gasoline and volume ratios of about 0.1 to 1.2 have been found advantageous. While in most cases temperature and time of alkylation are, within limits, compensating factors, it has been found, in the case of the alkylation of aromatic hydrocarbons and phenols, that the time of reaction after the addition of alkylating agent has been stopped, is of special importance. Thus, in such cases, the proportion of mono-alkylated products can be materially increased, with a corresponding decrease in the amount of unalkylated aromatic compound in the product, by providing time for continued reaction out of contact with newly added alkylating agent, particularly olefin. Other suitable variations in the process may be made.

Typical of the advantages of the process of the invention are the results in alkylating isobutane with ethylene. For this alkylation, a mixture of aluminum chloride and antimony trichloride in the proportions of 7.5 to 92.5 parts by weight were used. A steel reactor provided with a stirrer and heating coil was charged with this catalyst and isobutane in the proportions of 489 parts to 377 parts by weight together with sufficient water to produce the necessary amount of hydrogen chloride in the catalyst. The mixture was heated, the stirrer started and ethylene was then slowly added under sufficient pressure to maintain all the hydrocarbon in the reactor in the liquid phase. The ethylene apparently reacted almost instantaneously as the pressure never appreciably exceeded that of isobutane at the temperature of operation which was 80° C. Over a period of 1½ hours, 66 parts by weight of ethylene were added. On completion of the run the catalyst and hydrocarbon phases were separated and the products boiling higher than isobutane were recovered and analyzed. These were found to correspond to a yield of 292% based on the ethylene used or 95% of the theoretical dimethyl butane yield. This product was completely saturated and 95% boiled below 110° C. Little or no chlorine was found in the product. This type of product has an octane rating of about 87.

The pounds of product obtained per pound of aluminum chloride were more than twice that obtained under the best conditions with a solid aluminum chloride catalyst. Furthermore, by flash distillation of the used catalyst which solidified after the run, 92% was recovered as a straw-colored distillate which could be reused repeatedly by merely adjusting the aluminum chloride-antimony trichloride ratio.

Similar good results may be obtained in alkylating isopentane, isohexane, methyl cyclopentane, methyl cyclohexane and like tertiary carbon atoms containing aliphatic hydrocarbons or the corresponding unbranched hydrocarbons or suitable substitution products thereof, using ethylene or higher olefins such as propylene, normal or isobutylenes, one or more amylenes or higher olefins or olefin mixtures or olefin polymers. Instead of the olefins the corresponding alkyl halides or alkyl sulfates or primary alkyl halides or sulfates may be used. Other esters such as phosphates, borates or acetates and the like may also be used as the alkylating agent.

Benzene, naphthalene, toluene, xylene and like aromatic hydrocarbons or the corresponding hydroxy compounds such as the phenols or halogen substituted derivatives may be similarly alkylated with any of the foregoing or other suitable alkylating agents. Aralkyl compounds, corresponding to the foregoing alkylating agents, react in a similar manner in the process of the invention and are to be understood as being included in the expression "alkylating agent" as used generically in this specification and the appended claims. Thus, for example, benzyl chloride or either of the chloroethyl benzenes may be reacted with benzene in the presence of liquid mixtures of aluminum chloride and antimony chloride using operating conditions analogous to those described for the reaction of isobutane and ethylene.

It will thus be apparent that the invention is capable of wide modification not only with respect to the alkylations which may be carried out, but also in regard to the operating procedures which may be used.

We claim as our invention:

1. In a process for producing gasoline motor fuel from normally gaseous hydrocarbons, the step of reacting isobutane with a normally gaseous olefin in the presence of an alkylation catalyst comprising a liquid mixture of a complex double compound of anhydrous aluminum chloride and a hydrogen halide and a molecular excess based upon said aluminum chloride of a metal salt which does not react with the aluminum chloride.

2. In a process for producing gasoline motor fuel from a normally gaseous olefin, the step of treating a liquid mixture comprising said olefin and a stoichiometric excess of isoparaffin with a liquid mixture of a complex double compound of anhydrous aluminum chloride and a hydrogen halide and a metal salt which does not react with aluminum chloride at an alkylation temperature below 200° C.

3. In a process for producing gasoline motor fuel by alkylating a hydrocarbon in which a hydrogen atom can be substituted by an alkyl group, the improvement which comprises reacting said hydrocarbon with an olefin in the presence of a liquid mixture of a complex double compound of anhydrous aluminum chloride and a hydrogen halide and a metal salt which does not react with aluminum chloride at an alkylation temperature below 200° C.

4. In a process for producing gasoline motor fuel from a hydrocarbon mixture containing an olefin and an isoparaffin by treatment with an aluminum chloride catalyst under alkylating conditions, the improvement which comprises effecting said treatment in the presence of a liquid mixture of aluminum chloride, hydrogen chloride and a metal salt which does not react with aluminum chloride, said mixture having a melting point below 200° C.

5. In a process of alkylating a saturated aliphatic hydrocarbon having a tertiary carbon atom by reaction with an alkylating agent, the improvement which comprises effecting said alkylation in the presence of a molten mixture of an aluminum halide, the corresponding hydrogen halide and a metal salt which does not react with said aluminum halide and which has a normal boiling point below 300° C.

6. In a process of alkylating an aromatic compound by reaction with an alkylating agent, the improvement which comprises effecting said alkylation in the presence of a molten mixture of an aluminum halide, the corresponding hydrogen halide and a metal salt which does not react with said aluminum halide under the alkylating conditions.

7. In a process of alkylating an organic compound in which a hydrogen atom can be substituted by an alkyl group by reaction with an alkylating agent, the improvement which comprises contacting said reactants in the presence of a liquid mixture of an aluminum halide, a hydrogen halide and a metal salt which does not react with said aluminum halide.

8. In a process of alkylating an organic compound in which a hydrogen atom can be substituted by an alkyl group by reaction with an alkylating agent, the improvement which comprises contacting said reactants in the presence of a liquid mixture of aluminum chloride, a hydrogen halide and a molecular excess based upon said aluminum chloride of antimony trichloride.

9. In a process of alkylating an organic compound in which a hydrogen atom can be substituted by an alkyl group by reaction with an alkylating agent, the improvement which comprises contacting a mixture of said reactants and a hydrogen halide with a liquid mixture of aluminum chloride and antimony trichloride.

10. In a process of alkylating an organic compound in which a hydrogen atom can be substituted by an alkyl group by reaction with an alkylating agent, the improvement which comprises contacting said reactants with a liquid mixture of aluminum chloride and antimony trichloride in the presence of a hydrogen halide.

11. In a process of alkylating an organic compound in which a hydrogen atom can be substituted by an alkyl group by reaction with an alkylating agent, the improvement which comprises contacting said reactants in the presence of a liquid mixture of an aluminum halide and a molecular excess based upon said aluminum halide of a metal salt which does not react with said aluminum halide in the presence of a hydrogen halide.

WILLIAM E. ROSS.
SUMNER H. McALLISTER.
JOHN ANDERSON.